(12) United States Patent
Wang et al.

(10) Patent No.: US 11,309,738 B2
(45) Date of Patent: Apr. 19, 2022

(54) RECOVERY OF MODULATION AMPLITUDE IN WIRELESS CHARGER TX DEMODULATION

(71) Applicant: Integrated Device Technology, Inc., San Jose, CA (US)

(72) Inventors: Yue Wang, Santa Clara, CA (US); Lijie Zhao, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 458 days.

(21) Appl. No.: 16/052,492

(22) Filed: Aug. 1, 2018

(65) Prior Publication Data
US 2020/0044486 A1 Feb. 6, 2020

(51) Int. Cl.
*H02J 50/12* (2016.01)
*H02J 7/02* (2016.01)

(52) U.S. Cl.
CPC .............. *H02J 50/12* (2016.02); *H02J 7/025* (2013.01)

(58) Field of Classification Search
None
See application file for complete search history.

(56) References Cited

U.S. PATENT DOCUMENTS

| | | | | |
|---|---|---|---|---|
| 2006/0238301 A1* | 10/2006 | Wu | ....................... | G06K 7/0008 340/10.1 |
| 2014/0047920 A1* | 2/2014 | Nagata | .................... | H03F 3/193 73/504.12 |
| 2014/0232201 A1* | 8/2014 | Staring | ................... | H01F 38/14 307/104 |
| 2015/0008756 A1* | 1/2015 | Lee | ..................... | H02J 7/00034 307/104 |
| 2015/0171935 A1* | 6/2015 | Khandelwal | ......... | H03K 5/1536 455/41.1 |
| 2016/0336785 A1* | 11/2016 | Gao | ........................ | H02J 50/80 |

* cited by examiner

*Primary Examiner* — Jared Fureman
*Assistant Examiner* — Joel Barnett
(74) *Attorney, Agent, or Firm* — Haynes and Boone, LLP

(57) ABSTRACT

In accordance with aspects of the present invention, a method and apparatus for demodulating an amplitude-modulated wireless power signal is presented. A method of receiving an amplitude modulated component of a wireless power transmission signal according to some embodiments includes receiving an input signal, wherein the input signal is based on an amplitude modulated wireless power signal; and applying an offset to the input signal to receive the amplitude modulated component. A demodulator according to some embodiments can include a first voltage-to-current converter that receives an input signal related to an amplitude modulated wireless power signal; a second voltage-to-current converter that receives an offset signal; and a summing node that adjusts a first current produced by the first voltage-to-current converter by a second current produced by the second voltage-to-current converter to produce an output signal.

3 Claims, 3 Drawing Sheets

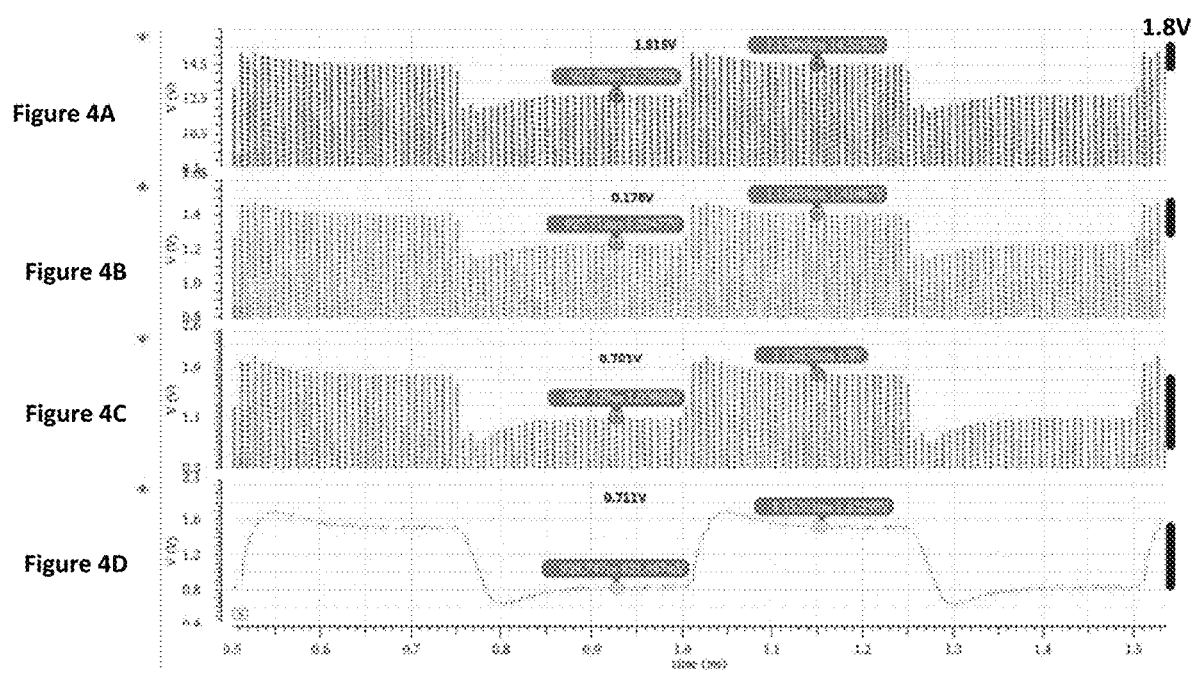

RECOVERY OF MODULATION AMPLITUDE IN WIRELESS CHARGER TX DEMODULATION

TECHNICAL FIELD

Embodiments of the present invention are related to wireless power transmitters and, specifically, to demodulation of a signal received by the transmitter.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The more common standards for wireless transmission of power include the Alliance for Wireless Power (A4WP) standard and the Wireless Power Consortium standard, the Qi Standard. Under the Wireless Power Consortium, the Qi specification, a resonant inductive coupling system is utilized to charge a single device at the resonance frequency of the receiver coil circuit. In the Qi standard, the receiving device coil is placed in close proximity with the transmission coil while in the A4WP standard, the receiving device coil is placed near the transmitting coil, potentially along with other receiving coils that belong to other charging devices.

In many wireless power systems, the wireless power transmitter and the wireless power receiver can communicate through an in-band communications path. In some examples, the wireless power transmitter can transmit data to the wireless power receiver using a frequency modulation method while the wireless power receiver transmits data to the wireless power transmitter using an amplitude modulation method. The wireless power receiver can, for example, modulate the amplitude of the transmitted wireless power signal by modulating a load coupled to the received power. The modulated amplitude provides a feed-back to the wireless power transmitter, which the wireless power transmitter can detect as an amplitude modulation.

Demodulation of the amplitude-modulated communications signal at the wireless power transmitter, therefore, is important to the performance of the in-band communications capability of the wireless power transceiver system. Therefore, there is a need to develop better wireless power transmitter technologies to handle receipt of amplitude modulated data signals.

SUMMARY

In accordance with aspects of the present invention, a method and apparatus for demodulating an amplitude-modulated wireless power signal is presented. A method of receiving an amplitude modulated component of a wireless power transmission signal according to some embodiments includes receiving an input signal, wherein the input signal is based on an amplitude modulated wireless power signal; and applying an offset to the input signal to receive the amplitude modulated component. A demodulator according to some embodiments can include a first voltage-to-current converter that receives an input signal related to an amplitude modulated wireless power signal; a second voltage-to-current converter that receives an offset signal; and a summing node that adjusts a first current produced by the first voltage-to-current converter by a second current produced by the second voltage-to-current converter to produce an output signal.

These and other embodiments are further discussed below with respect to the following figures.

BRIEF DESCRIPTION OF THE DRAWINGS

FIG. 4A illustrates a simulation of a signal sent from wireless power receiver.

FIG. 4B illustrates a simulation of the demodulated signal that has been attenuated.

FIG. 4C illustrates a simulation of a demodulated signal where signal has been adjusted according to some embodiments.

FIG. 4D illustrates simulation results of the demodulated signal after peak detection.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting the claims, which define the protected invention. Various changes may be made without departing from the spirit and scope of this description and the claims. In some instances, well known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
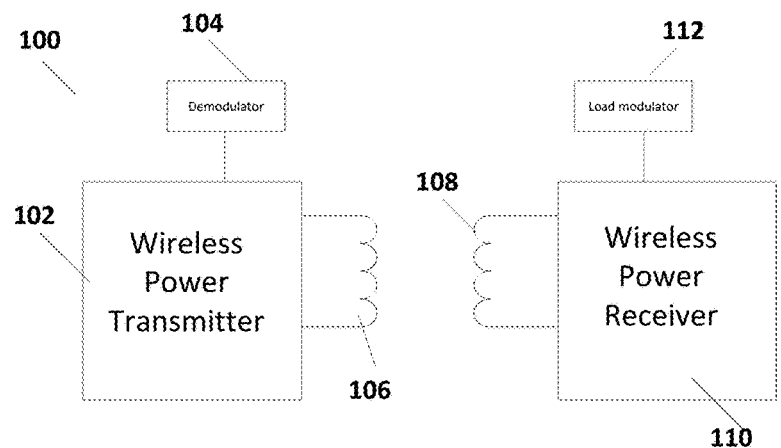
FIG. 1 illustrates a wireless power transmission system.

FIG. 1 illustrates a simplified wireless power system 100. As illustrated in FIG. 1, a wireless power transmitter 102 drives a transmit coil 106 to produce a time-varying electromagnetic field at a particular frequency. Receiver coil 108 of wireless power receiver 110 couples with the electromagnetic field generated by transmit coil 106 of wireless power transmitter 102 to receive the wireless power that is transmitted. Transmitter 102 may be configured to generate a time-varying electromagnetic field in the presence of a wireless power receiver 110, which is configured to receive the wireless power transmitted by the wireless power transmitter 102. The elements of the wireless power transmitter 102 and wireless power receiver 110 may vary in size and shape to accommodate power requirements and physical location of wireless power system 100.

Wireless power receiver 110 recovers the power from the time varying electromagnetic field and typically provides DC power input to a load of a device that includes wireless power receiver 110 and receive coil 108. Power is transferred when the device is proximate wireless power transmitter 102. In many cases, to better facilitate transfer of power between wireless power transmitter 102 and wireless power receiver 110, communications are established between the wireless power transmitter 102 and wireless power receiver 110. This communications can be used to facilitate efficient power transfer and may be used for the transfer of other data between wireless power transmitter 102 and wireless power receiver 110.

In some examples, wireless power transmitter 102 may transmit data to wireless power receiver 110 using frequency modulation of the wireless power signal. Wireless power receiver 110 can then demodulate the frequency modulated wireless power signal to receive the transmitted data. Conversely, wireless power receiver 110 can amplitude modulate the wireless power signal at transmitter 102 by modulating a load coupled to the received wireless power. The load modulation provides a detectable amplitude modulation in the wireless power transmitted by the wireless power transmitter 102.

As illustrated in FIG. 1, wireless power receiver 110 may include a load modulator 112. Load modulator 112 includes control circuitry that can provide signals to wireless power transmitter 102 as an amplitude modulated signal by modulating a load across the received wireless power. The load modulating applied by load modulator 112 provides a feedback signal to wireless power transmitter 102 that results in an amplitude modulation on the wireless power signal. Data to be transmitted to wireless power transmitter 102 may be encoded within the amplitude modulation. As a consequence, the wireless power signal at wireless power transmitter 102 is amplitude modulated by load modulator 112 to carry the data. The amplitude modulation is demodulated by demodulator 104.

As is further illustrated in FIG. 1, wireless power transmitter 102 may include a demodulator 104 which includes circuitry for detecting the amplitude modulated signal in the wireless power signal at transmitter 102. Demodulator 104 recovers the data modulated into the wireless power signal at wireless power receiver 110.

In some cases, power receiver 110 and transmitter 102 may each be formed on single chips, which are then mounted on a printed circuit board (PCB). However, in many cases, some or all components of demodulator 104 are formed separately from transmitter 102. Consequently, demodulator 104 may be formed on the same chip as wireless power transmitter 102 or may be formed, at least partially, off the chip and coupled with the wireless power transmitter 102. The data transferred between wireless power receiver 110 and wireless power transmitter 102 can be used to control the characteristics of the time-varying electromagnetic field that is produced by the wireless power transmitter 102 in order to control the wireless power transfer. As discussed above, demodulation is often done outside of the wireless power transmitter 102 integrated circuit.

Figure 2A:
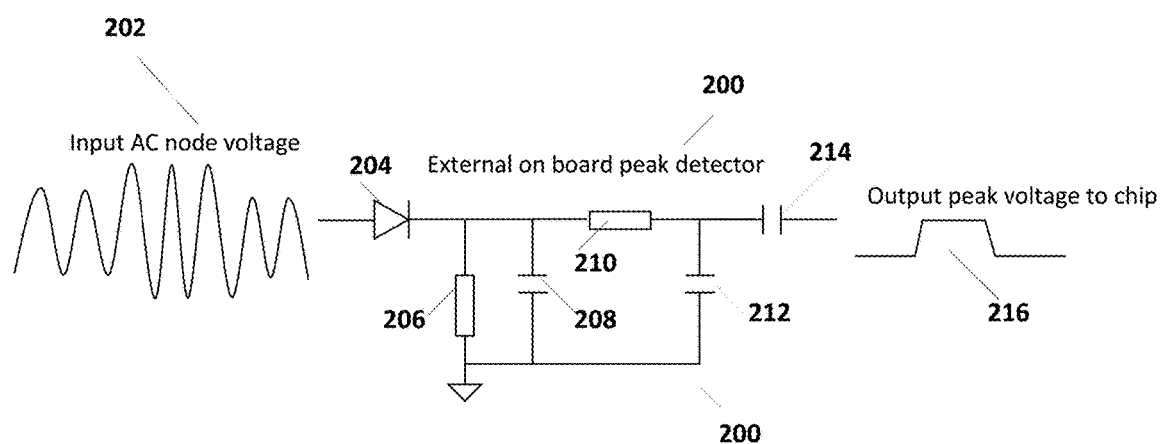
FIG. 2A illustrates an example peak detector circuit.

FIG. 2A illustrates an example of a peak detector 200 that has been previously used to detect the amplitude of the amplitude modulation of the wireless power signal at transmitter 102. In a wireless power signal, the modulation amplitude of the signal can vary from as small as 100 mV to about 2V. Although peak detector 200, when an envelope detection circuit, may provide very small amplitude attenuation, it requires a number of devices on the printed circuit board external to the wireless power transmitter chip that includes demodulator 104.

As discussed above, FIG. 2A illustrates a peak detector 200, which can be referred to as an amplitude modulation [AM] detector, a pulse amplitude modulation [PAM] detector or an envelope detector, that may be used to detect the peak voltage of the amplitude modulated signal. The example peak detector illustrated in FIG. 2A includes a diode 204, resistor 206 and capacitor 208 coupled in parallel between the output of diode 204 and ground, resistor 210 coupled to the output of diode 204, a capacitor 212 coupled between resistor 210 and ground, and output capacitor 214. An input signal 204, which includes an amplitude modulation, asserted to the input of diode 204, consequently, appears as output signal 216, which can be input to wireless power transmitter 102. Output signal 216 corresponds with the peak value of the feedback signal that the load modulator 112 of the wireless power receiver 110 communicated to the wireless power transmitter 102 via the in-band communications channel. Typically, the components of peak detector 200 are discrete components arranged on the circuit board and are not part of an integrated circuit that can include wireless power transmitter 102.

Figure 2B:
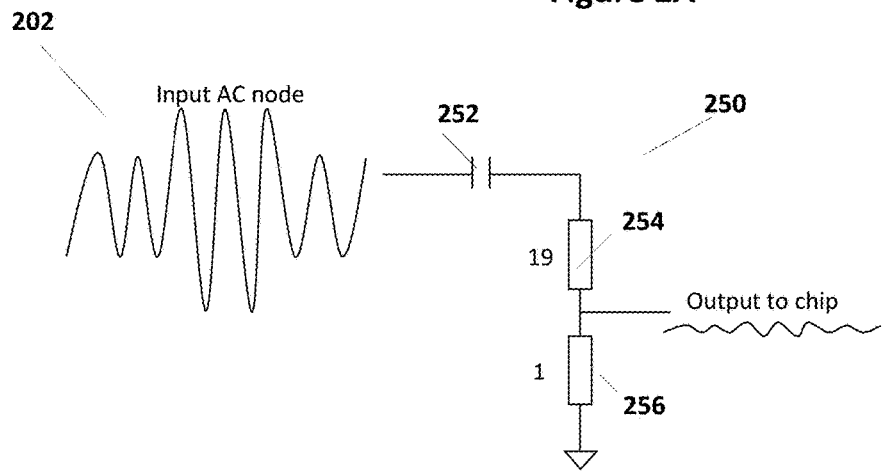
FIG. 2B illustrates a signal attenuation circuit.

More components can be placed on the chip if the input signal is attenuated prior to input to the chip. FIG. 2B illustrates an attenuation circuit that can be used. As illustrated in FIG. 2B, attenuation circuit 250 includes a capacitor 252 coupled in series with a voltage divider formed by series-coupled resistors 254 and 256. As illustrated in FIG. 2B, the output signal 258 is related to the input signal 202 by an attenuation related to the ratio of resistors 254 and 256 and, for example, be an attenuation of 1/20.

In some embodiments amplitude attenuation circuit, such as the one depicted in FIG. 2B, is used to better enable the measurement of the amplitude of the amplitude modulated signal with a demodulator 104 on the same chip as with transmitter 102. However, when the original amplitude of the modulated feedback signal is only 100 mV the attenuated signal may only have amplitude of 5 mV when attenuated as shown in FIG. 2B. When the amplitude of the signal is attenuated from the original signal where the original has a value for the amplitude as small as 100 mV or similar the stress on the demodulator and the likelihood of an incorrect demodulation is increased.

The signal may be attenuated by the signal attenuation circuit 250 pictured FIG. 2B before it is provided to demodulator 104 or wireless power transmitter 102 as needed. As discussed above, the signal provided to demodulator 104 may be attenuated by as much 1/20 of the original signal. For purpose of example, the amplitude can range from 100 mV to 2V, therefore the attenuated signal can be as low as 5 mV to 0.1V. In further embodiments the attenuation could be 1/3 or 1/2 the original signal or even have no attenuation at all if so desired irrespective of any standard that may exist. However, such small signals have caused problems and stresses for the external devices and integrated demodulations devices due to the small amplitude of the signal.

In accordance with some embodiments of the present invention, a method of demodulating a signal sent to wireless power transmitter 102 is presented. In particular, in some embodiments, a constant value is removed from the wireless power signal, leaving primarily the amplitude modulation component of the signal. Although signal attenuation can be applied, the result of processing a signal that is primarily the amplitude modulation component rather than processing the whole wireless power signal is advantageous in several ways. For example, many components for peak detection of the amplitude modulation component of the signal can be included in an integrated circuit that includes transmitter 102. Additionally, more accurate demodulation can be achieved.

In some embodiments wireless power transmitter 102 is formed on an integrated circuit while demodulator 104 is located separately and coupled to the wireless power transmitter 102. In some embodiments, demodulator 104 may include a peak detector such as peak detector 200 and may include a signal attenuation circuit such as signal attenuation circuit 250. In some embodiments, a modulation amplitude receiver is provided to separate the amplitude modulation component from the wireless power transmission signal. As such, modulation amplitude receiver removes at least a portion of the wireless power signal to leave the modulation amplitude receiver component. Modulation amplitude recovery can reduce complexity of demodulation 104 and reduces the likelihood of inaccurate detection of the modulated data. These two benefits increase efficiency of the demodulator 104 as well as the wireless power transmitter 104.

In some embodiments, demodulator 104 may be formed on the same integrated circuit as is transmitter 102. Demodulator 104 may, for example, include a modulation amplitude recovery circuit as well as a peak detector and/or a signal attenuation circuit as described above. Without the need to process the full wireless power signal, the components of a peak detector and/or signal attenuation circuit can be small enough to form on an integrated circuit, and therefore the need for separate circuit components is reduced and in some cases eliminated. The demodulation circuit uses the modulation amplitude recovery to remove the wireless power signal, leaving the amplitude modulation component. The received wireless power signal with amplitude modulation may or may not be attenuated in demodulator 104 prior to separation of the amplitude modulated component. In either case, the resulting amplitude modulated signal can be of sufficiently low voltage that separate components in a peak detector are not necessary. Consequently, the complexity of demodulator 104 is reduced the more accurate demodulation results. These two benefits increase efficiency of demodulator 104 as well as that of wireless power transmitter 102.

Figure 3:
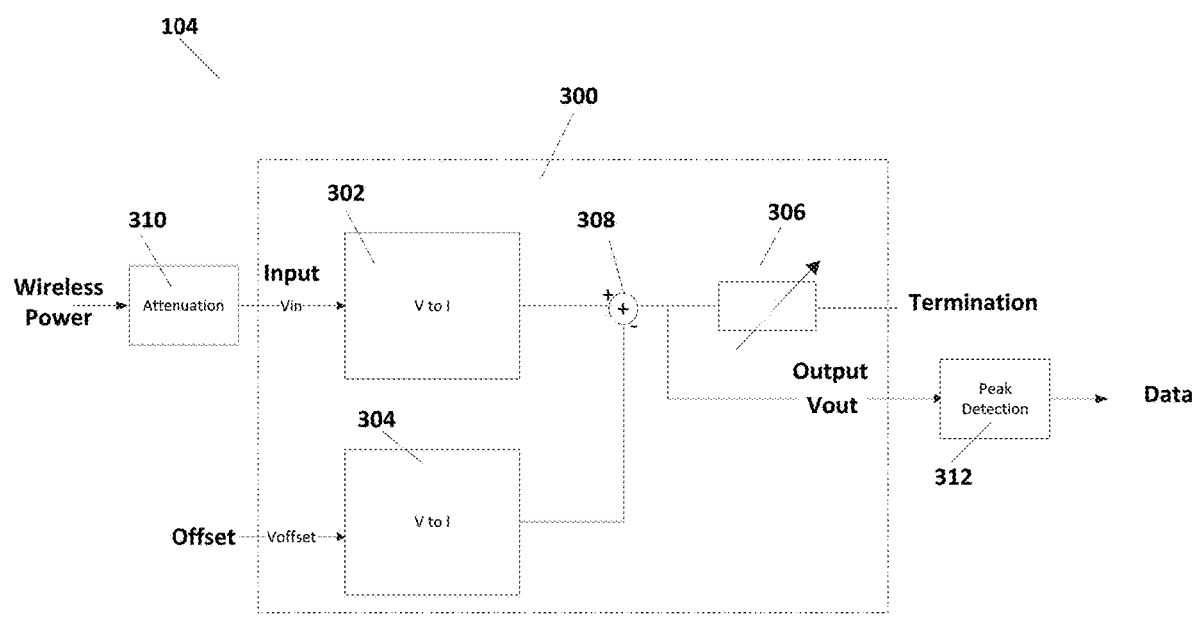
FIG. 3 illustrates block diagram of a modulation amplitude recovery circuit according to some embodiments of the present invention.

FIG. 3 illustrates a high level diagram of a modulation amplitude recovery circuit 300 according to some embodiments. As illustrated in FIG. 3, modulation amplitude receiver 300 includes a voltage-to-current converter 302 that receives the input voltage $V_{in}$, which is the wireless power signal with amplitude modulation from receiver 110. The current output from voltage-to-current converter 308 is provided to a summing node 308. Summing node 308 in FIG. 3 is illustrated as a summing device. However, in many embodiments summing node 308 would be a node where current from voltage-to-current converter 302 and voltage-to-current converter 304 are combined.

FIG. 3 also illustrates a voltage-to-current converter 304, which receives an offset voltage $V_{offset}$. The current output from voltage-to-current converter 304 is subtracted from the current output from voltage-to-current converter 302 is summing node 308. The output current from summing node 308 is input to a variable resistance 306, which is coupled to a termination voltage. The termination voltage may be, for example, ground. The voltage across variable resistance 306, therefore, represents the output voltage $V_{out}$.

As is illustrated in FIG. 3, an offset voltage Voffset is input to voltage-to-current converter 304. Offset voltage Voffset determines the amount of current subtracted in summer 308. The offset voltage can be adjusted such that substantially all of the wireless power signal is removed from output current from summing node 308, leaving only the amplitude modulated component. In some embodiments, the offset voltage can be adaptively chosen.

The summation of the two current signals from voltage-to-current converters 302 and 304 leaves the amplitude modulated signal component from which the transmitted data can be recovered. The data can then be used in wireless power transmitter 102 to adjust the characteristics of the transmitted wireless power signal.

As is further illustrated in FIG. 3, in some embodiments, the input signal Vin to modulation amplitude recovery circuit 300 may be provided by an attenuation circuit 310. Attenuation circuit 310 may, for example, be similar to attenuation circuit 250 illustrated in FIG. 2B or may be another circuit that has the effect of attenuating the wireless power signal. Further, the output voltage $V_{out}$ from modulation amplitude recovery circuit 300 may be provided to a peak detection circuit 312 to provide a data stream from the amplitude modulated component. Peak detection circuit 312 may, for example, be similar to peak detection circuit 200 illustrated in FIG. 2A. However, components of peak detection circuit 312 may be smaller due to the lowered voltages provided at output voltage $V_{out}$.

As illustrated in FIG. 3, modulation amplitude recovery circuit 300 may receive an attenuated input signal Vin, which may allow for a decrease in power in demodulation circuit 104, may result in an increase in efficiency, and may result in higher accuracy of the received data by the wireless power transmitter 102. Instead of attenuating the wireless power voltage by as much as ½0, as is illustrated in FIG. 2B, the voltage, if attenuated at all, may have a much lower attenuation, for example as low as ⅓ to ½.

FIGS. 4A, 4B, 4C, and 4D illustrate example signals at various locations in demodulator 104 according to some embodiments of the present invention. The voltages and signals illustrated in FIGS. 4A, 4B, 4C, and 4D are exemplary only and are not intended to be limiting in any way. Other signal voltages, other attenuations, and other examples of offsets can be used in embodiments of the present invention.

FIG. 4A shows an example of a typical wireless power signal input to attenuation 310 of FIG. 3. As illustrated in FIG. 4A, the wireless power signal input peaks at about 15V. The amplitude modulation component ranges from about 12.7 volts to about 14.5 volts at the points sampled in FIG. 4A, for a peak-to-peak amplitude modulation of about 1.8 V which is on top of a DC offset of about 12V.

As illustrated in FIG. 3, in some embodiments the wireless power signal input can be attenuated in attenuation 310. The resulting attenuated wireless power signal, which is the input signal Vin as illustrated in FIG. 3, is illustrated in FIG. 4B. In the particular example illustrated in FIG. 4b, the attenuation is about ⅒. As described above with respect to FIG. 2B, a signal divider may be set by a ratio of resistors in a divider circuit or other methods may be used to attenuate the input signal. This leaves a modified signal that is attenuated by ⅒ of the original DC offset voltage as the feedback characteristic signal. As is further illustrated in FIG. 4B, the voltage of the attenuated $V_{in}$ now ranges to about 1.4 V instead of about 14V and the modulation signal lies between about 1.23V and 1.4 V at roughly the same sampling points as illustrated in FIG. 4A. Consequently, the modulation amplitude is now about 0.18V in this example.

In FIG. 3, the current output from summer 308 is converted to a voltage by adjustable resistor 306, which is coupled to a termination voltage. The value of adjustable resistor 306 may be set so that final value of the voltage resulting from the current output of summer 308. As is discussed above, the offset adjustment in summer 308 that is based on offset voltage $V_{offset}$, can result in the output voltage $V_{out}$ illustrated in FIG. 4C. Additionally, the modulation amplitude of the output voltage Vout can be higher than the modulation amplitude of the input voltage $V_{in}$. For example, FIG. 4C illustrates a modulation signal between 1.1V and 1.8 V with a modulation signal, or an overall amplitude modulation of 0.701V, which is about four times the amplitude modulation of the input voltage Vin as illustrated in FIG. 4B.

As is further illustrated in FIG. 3, the output voltage Vout, which was illustrated in FIG. 4C, can be input to a peak detector 312. FIG. 4D illustrates the data output of peak detection 312. As shown in FIG. 4D, peak detector 312 produces a signal that accentuates the data that has been transmitted. In the particular example illustrated in FIG. 4D, the modulation range can be from, for example, 0.821 V to 1.5V, resulting in an amplitude of about 0.7V.

As illustrated in FIG. 3, modulation amplitude detection circuit 300 may be formed on a IC. That IC may also include much of transmitter 102. Furthermore, the IC may also include most, if not all, of attenuation circuit 310 and peak detector 312. Modulation amplitude detection circuit 300 provides for the recovery of the amplitude modulated signal that is part of the wireless power signal without requiring larger components that would need to be implemented separately from the IC.

The above detailed description is provided to illustrate specific embodiments of the present invention and is not intended to be limiting. Numerous variations and modifications within the scope of the present invention are possible. The present invention is set forth in the following claims.

What is claimed is:

1. A method of receiving an amplitude modulated component of a wireless power transmission signal, comprising;
   receiving an input signal by converting the input signal to an input current signal, wherein the input signal is based on the amplitude modulated wireless power signal of the wireless power transmission signal;
   applying an offset to the input signal to produce an output signal, wherein applying an offset includes converting an offset voltage to an offset current and subtracting the offset current from the input current signal to create the output signal such that the output signal is primarily an amplitude modulation portion of the amplitude modulated wireless power signal; and
   processing the output signal to receive the amplitude modulated component, wherein processing the output signal includes converting the output current signal to a voltage output signal representing the amplitude modulated component, wherein a modulation amplitude of the voltage output signal is greater than a modulation amplitude of the input signal.

2. The method of claim 1, wherein processing the output signal further includes providing peak detection to the voltage output signal to provide a data signal.

3. The method of claim 1, wherein receiving the input signal includes
   receiving the wireless power transmission signal; and
   attenuating the wireless power transmission signal to form the input signal.

* * * * *